United States Patent
Goldband et al.

(10) Patent No.: US 9,026,608 B1
(45) Date of Patent: May 5, 2015

(54) METHODS AND SYSTEMS FOR APPLICATION PROGRAMMING INTERFACE MASHUPS

(75) Inventors: Adam Goldband, Antioch, CA (US); Kirill Ulyanov, San Ramon, CA (US); Satish Gudiboina, Arlington, VA (US)

(73) Assignee: CBS Interactive Inc., San Francisco, CA (US)

( * ) Notice: Subject to any disclaimer, the term of this patent is extended or adjusted under 35 U.S.C. 154(b) by 1101 days.

(21) Appl. No.: 12/981,446

(22) Filed: Dec. 29, 2010

(51) Int. Cl.
G06F 15/16 (2006.01)
G06F 9/44 (2006.01)

(52) U.S. Cl.
CPC .................................. *G06F 8/35* (2013.01)

(58) Field of Classification Search
CPC ............ G06F 17/30; G06F 17/30893; G06F 17/30011; H04N 21/2665; G06Q 30/0621
See application file for complete search history.

(56) References Cited

U.S. PATENT DOCUMENTS

| | | | |
|---|---|---|---|
| 7,016,068 B1* | 3/2006 | Gnocato et al. | 358/1.18 |
| 7,584,149 B1* | 9/2009 | Bishop et al. | 705/51 |
| 7,987,171 B2* | 7/2011 | Tesler et al. | 707/706 |
| 8,117,121 B2* | 2/2012 | Rosko | 705/38 |
| 8,122,007 B2* | 2/2012 | Mayer et al. | 707/713 |
| 8,595,625 B2* | 11/2013 | Hung et al. | 715/735 |
| 2002/0077848 A1* | 6/2002 | Campbell | 705/1 |
| 2007/0031112 A1* | 2/2007 | Ricci | 386/95 |
| 2007/0282616 A1* | 12/2007 | Brunswig et al. | 705/1 |
| 2008/0263126 A1* | 10/2008 | Soman | 709/201 |
| 2009/0012949 A1* | 1/2009 | Thompson et al. | 707/4 |
| 2009/0276215 A1* | 11/2009 | Hager | 704/235 |
| 2010/0153530 A1* | 6/2010 | Erickson et al. | 709/223 |
| 2012/0131041 A1* | 5/2012 | Ashland et al. | 707/769 |

* cited by examiner

*Primary Examiner* — Joshua Joo
*Assistant Examiner* — Younes Naji
(74) *Attorney, Agent, or Firm* — Marc S. Kaufman; Amardeep S. Grewal; Reed Smith LLP

(57) ABSTRACT

Methods, systems, and computer-readable media for providing customized content delivery from one or more data sources include receiving a selection of one or more base requests for content; receiving a selection of a custom request for content; receiving a mapping of the custom request to at least one of the base requests; building an output template including the custom request mapped to the at least one of the base requests; and publishing a resource based on the output template.

18 Claims, 8 Drawing Sheets

METHODS AND SYSTEMS FOR APPLICATION PROGRAMMING INTERFACE MASHUPS

BACKGROUND

In addition to conventional web pages, such as Hypertext Markup Language ("HTML") pages, the internet provides many machine data sources that may provide data directly to a computing device in response to a request. A uniform resource locator ("URL") may, for example, provide access to, and a set of Hypertext Transfer Protocol ("HTTP") methods for interacting with, a front end providing an Application Programming Interface ("API"), a Really Simple Syndication ("RSS") feed, or other interfaces/feeds. An API generally includes a set of HTTP request messages along with the definition of the structure of response messages, for example in JavaScript Object Notation ("JSON") or Extensible Markup Language ("XML"). Current APIs have moved away from being synonymous with "web services" toward Representational State Transfer ("REST") style architecture. REST architectures include clients who initiate requests to servers and servers that process the requests and return appropriate responses. A REST-ful API generally includes a Uniform Resource Indicator ("URI") for the API, a type of data supported by the API (e.g., XML, JSON, or any other supported data type), and a set of HTTP methods. Thus, any client may interact with any server by using a set of operations supported by HTTP methods (e.g., GET, PUT, POST, and DELETE) in conjunction with the URI. Further referenced APIs may be considered REST-ful APIs.

In web development, a "mashup" may be defined as a web page or application that uses and combines data, presentation or functionality from two or more data sources to create new services (e.g., a new website, API, or syndication feed). Published APIs allow for the combination of multiple services or data sources into mashups. However, creation of a mashup generally requires custom coding to directly retrieve data from various APIs, databases, search indexes, or other data sources, and requires custom logic be built, for example in Java, to manually parse through the retrieved data. Conventional methods for creating mashups fail to provide a convenient way to combine together the data from various data sources to deliver downstream, for example for syndication.

Applications and tools have been created to assist with creation of mashups. For example, YAHOO!™ PIPES is a web application that provides a graphical user interface for building data mashups that aggregate web feeds, web pages, and other services to create web-based applications. However, such systems do not allow a user to modify the rendering of the data provided by the feeds and services. Additionally, such systems limit data sources useful for creation of a mashup to HTML data sources, while it may be desirable to mashup data from alternative data sources, for example MICROSOFT™ EXCEL™ files, MICROSOFT™.PST files, or any other data sources.

While the system and method is described herein by way of example and embodiments, those skilled in the art recognize that methods and systems for API mashups are not limited to the embodiments or drawings described. It should be understood that the drawings and description are not intended to limit embodiments to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide systems and methods for combining together data from various data sources to deliver downstream as a custom resource, for example an API. Embodiments include systems and methods for building templates for combining data from various data sources, formatting the data, and publishing a custom resource for downstream access to the combined and formatted data.

Figure 1:
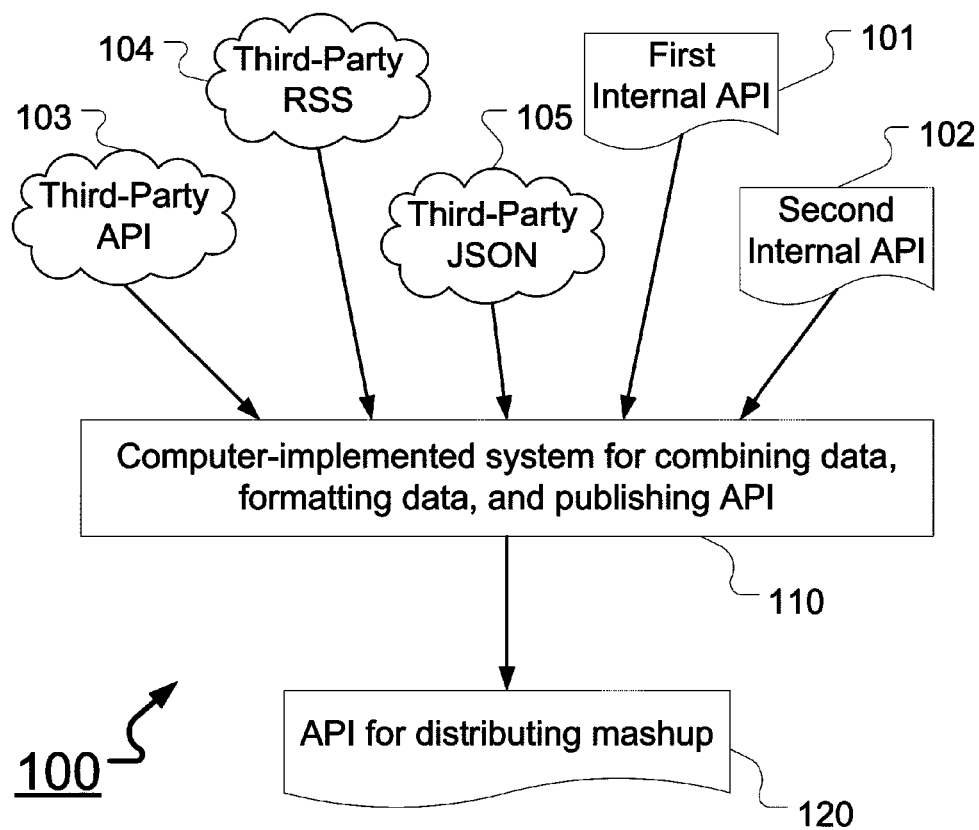
FIG. 1 is an exemplary conceptual diagram of a data flow through computing system for creating a mashup of content from one or more data sources and delivering the mashup downstream as a resource according to an embodiment.

FIG. 1 is a conceptual diagram of a data flow through an exemplary computing system 110 for creating a mashup of content from one or more data sources 101-105 and delivering the mashup downstream as a resource 120, for example an API as shown. The system 110 may include plural user-created templates for formatting and combining data retrieved from any HTTP input and output any type of output. Thus, system 110 may provide a self-managed delivery system for data retrieved from one or more data sources.

Exemplary, data sources shown in FIG. 1 include a first internal API 101, a second internal API 102, a third party API 103, a third party RSS feed 104, and a third party JSON object 105. Of course, system 110 may mashup content received from any number and type of internal or third-party (i.e., external) data sources. Additionally, while known HTTP data sources are shown, the mapping of system 110, described in detail below, may be useful for creating mashups of future developed data sources. Further, data files, such as MICROSOFT™ EXCEL™.XLS files or MICROSOFT™ EXCHANGE™.PST files, may be served from behind a web server, thereby allowing system 110 to map directly to data from the data files for a mashup. Alternatively, system 110 may directly access structured data files for mashups without requiring that they be served from behind a web server.

The computer-implemented system 110 is configured to retrieve data from one or more data sources, such as data sources 101-105, perform one or more of combining the retrieved data (e.g., combing data retrieved from two independent APIs), modifying the retrieved data (e.g., performing a mathematical function on retrieved data), and modifying the presentation of the data (e.g., changing the format of a date).

For example, system 110 may provide an API resource 120 to allow systems to access a mashup of data including data provided by first internal API 101 (i.e., an API provided behind a firewall and not publicly available) and second internal API 102. System 110 may include a template mapping a request parameter received by API resource 120 to the mashup of data retrieved from data sources. For example, first internal API 101 may be an API configured to provide information about a plurality of electronic products and a second internal API 102 may be configured to provide user generated content ("UGC") relating to electronic products (e.g., user reviews). API resource 120 may receive a parameter and value indicating a request for information about a specific product. System 110 may be configured to map the request received by API resource 120 to a mashup of data from APIs 101 and 102, send an HTTP request including parameters indicating the specific product to the first internal API 101 to retrieve information about the product, send an HTTP request including parameters indicating the specific product to the second internal API 102, combine, format, and modify the data according to the template, and return the mashup data via API resource 120.

Likewise, system 110 may provide an API resource 120 to allow systems to interact with external resources (i.e., resources not behind a firewall and, thus, publicly available). For example, a website may be designed to provide a catalog of products offered by CDW™ for sale as well as review information relating to those products from CNET™. Such a system may be hosted by CNET™, thus the system may retrieve data from an internal or external API from CNET™ and retrieve data from an external API from CDW™. Alternatively, CDW™ may host such a system, thus the system may retrieve data from an internal or external API from CDW™ and retrieve data from an external API from CNET™. Still further, a third party company, such as a company hired to provide an online catalog of CDW™ product offerings, may retrieve data from external APIs from both CDW™ and CNET™. Independent of the arrangement, such a system may include a custom API resource and, in response to an HTTP request including one or more parameters and values, pull data from both the CDW™ API and the CNET™ API, mashup the data, and return the data via the custom API resource.

Of course, while these examples each retrieve and mashup data retrieved from two data sources, embodiments may mashup data from several or more data sources. Embodiments may also include systems useful for creating a mashup of a single data source. In other words, as used herein a mashup of a single data source may include providing a resource to access modified data, presentation, and/or the functionality of a single data source.

Thus, embodiments may be useful for presenting a convenient resource 120 to a user with reformatted, modified, or combined data from a single data source (e.g., first internal API 101). For example, a first system may have a conventional API configured to output specific data in response to predefined parameters. However, a second system may be configured to retrieve specific data from APIs using different predefined parameters. Rather than requiring modification of either the first system or the second system, methods and systems disclosed herein may provide a custom resource to allow the second system to interact with the first system. The second system may send requests to a third system having a custom API using the second system's predefined parameters, the third system may map the predefined parameters of the second system to the predefined parameters of the first system and, thus, send a request to the first system using the first system's predefined parameters, the third system may then receive the data initially requested by the second system and transmit the data on to the second system. In such a fashion, the methods and systems disclosed herein may minimize modifications necessary to existing systems while increasing compatibility and usability of the same systems.

Further, a system may be configured to interact with several different APIs in an automated fashion by making HTTP requests to a single custom resource (e.g., an API) with a single set of parameters. Conventionally, to allow a system to interact with multiple APIs either custom request parameters were required to interact with each API or each API was required to be designed or modified to allow a client to interact with the API via a single, uniform set of parameters. This presents problems because redesigns may be arduous and APIs from different data providers may not have an interest in modifying their API to recognize the same parameters of another (e.g., a competitor). Additionally, redesigning an API to comply with a specific system may create incompatibilities with both internal and external systems configured to interact with an API before the redesign. Instead of redesigning an API, systems and methods described herein may map the HTTP requests and parameters from a system to existing API requests and parameters used by the API, thus obviating the need to modify the API.

Figure 2:
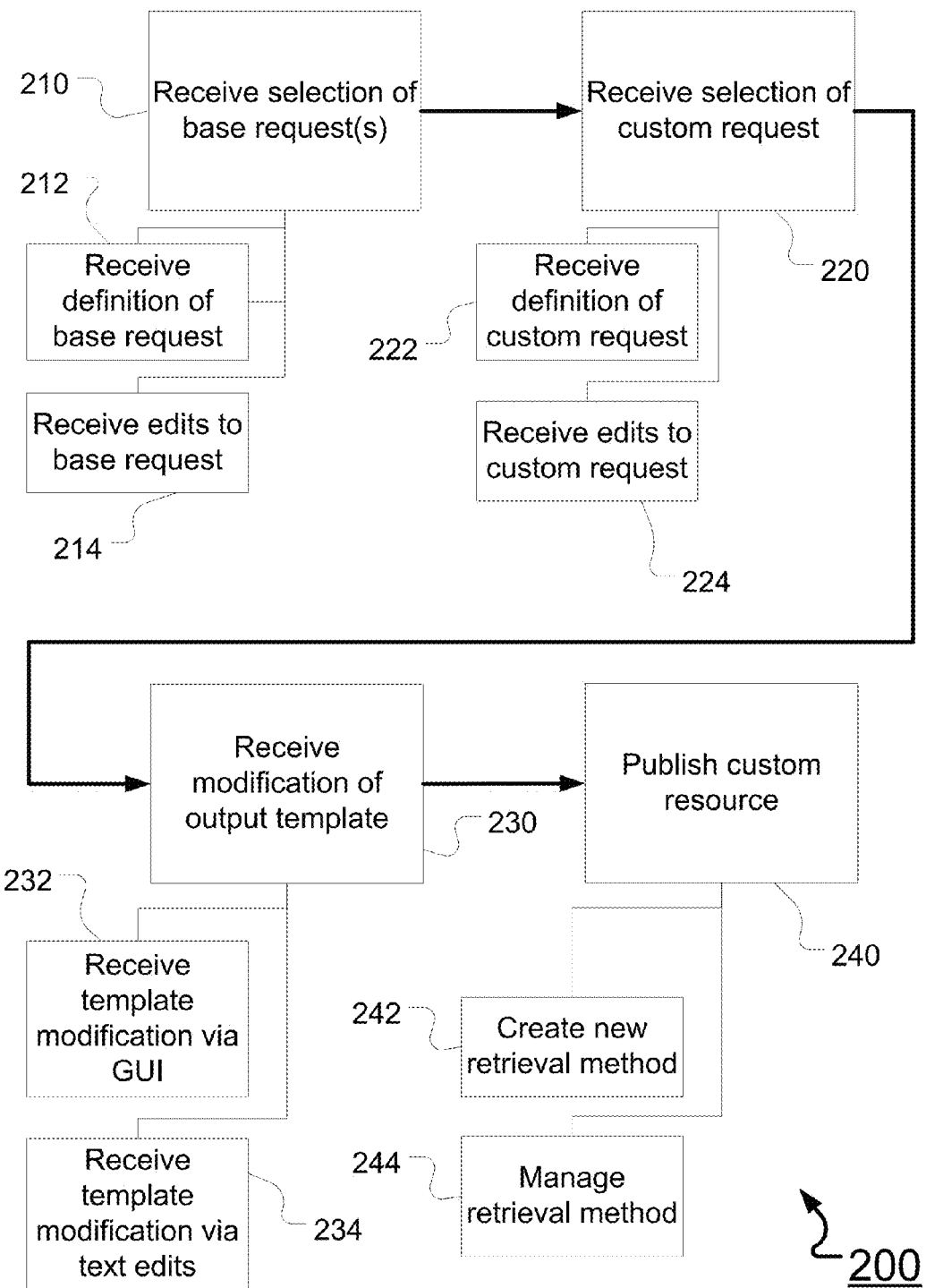
FIG. 2 shows a block diagram of a computer-implemented method for providing customized content delivery from one or more data sources according to an embodiment.

FIG. 2 shows a block diagram of a computer-implemented method for providing customized content from one or more data sources. At step 210, a computing device receives, from a user, selection of one or more base requests (i.e., requests to data sources such as APIs or RSS feeds) to mashup. Next, at step 220, a computing device receives selection of a custom request (i.e., a request to be received by the custom resource) and selection of at least one of the base requests to map to the custom request. At step 230, a computing device receives selection, from a user, mapping of the custom request to one or more output template variables (i.e., map the output of the custom request to the template inputs). At step 240, a computing device may build and publish a custom resource. The published custom resource may be useful for providing mashups of data from the one or more resources accessed by base requests selected in step 210. The following describes each of these steps in greater detail.

As described above, at step 210 of the method shown in block diagram 200 a computing device receives from a user selection of a base requests to mashup. The requests may be to one or more resources (i.e., data sources) such as APIs or RSS feeds. For example, in step 212, the computing device may allow a user to define a base request. The computing device may prompt a user to enter a name for the base request, a Web Application Description Language ("WADL") URL, and a base request URL. The WADL URL may provide parameters that may be received with the request, for example as an XML file, to indicate data to be retrieved from the resource. Alternatively, if a WADL URL is not available, or not known to the user, for a resource, a user may enter a URL for the request and then manually enter one or more parameters for the request. Further, if a user does not know the specific parameters for a request, the user may enter a sample URL including several parameters and parameter values and a computing device may parse the URL to detect assumed parameters and parameter values.

For a base request, the computing system may also receive additional data, such as a description of the base request and a base request type. Additionally, attributes of each parameter may be set, for example values for each parameter, default values for each parameter, and whether or not a parameter is required. Additionally, parameters may be added or deleted for the base request.

The base request, and its associated parameters, may then be stored by a computing device in a database of base requests. A computing device may also create a Document Object Model ("DOM") or JSON object to encapsulate base requests and associated parameters. Of course, additional data may be defined for a base request depending on the format of the base request (e.g., API requests, RSS requests, etc.). A computing device may allow a user to repeat step 212 to add additional base requests.

A computing device may also have one or more base requests and associated parameters already defined in a database. For example, a computing device may have a library of internal requests (i.e., requests to resources behind the same firewall as the computing device and not available to the public). In such a case, a user may not be required to define any additional base requests. Alternatively, even with all internal requests defined, a user may enter definitions of one or more requests to external resources (e.g., resources generally available to the public).

At step 214, a computing device may allow a user to edit a saved base request and any parameters for the saved base request. A conventional user interface ("UI") control, such as a drop down menu, may allow a user to access each saved base request from a database and edit the base request or a base request's associated parameters. For example, a user may whish to update the URL for a base request. The computing device may then allow a user to save the edited base request or may be configured to automatically save the edited base request.

A computing device may also provide additional tools to allow a user to manage one or more base requests. For example, a system may allow a user to delete base requests a user no longer intends to use. Additionally, a computing device may allow a user to arrange base requests, for example in a custom order or in a hierarchy (e.g., under various folders and sub-folders), to provide ease of navigation of base requests for selection and editing. Further, a user may be able to direct a computing device to remote definitions of base requests, for example stored on a remote database, on removable media (e.g., compact discs, thumb drives, etc.), or on any other medium, and the requests may be loaded into a database and saved as base requests for later use.

At the end of step 210, one or more requests to one or more resources are stored in a database. Of course, if all requests to resources a user wishes to mashup (i.e., to retrieve data from) are already stored in a database, step 210 may be omitted from the method shown in block diagram 200. Next, at step 220, a computing device may receive selection of a custom request and one or more base requests to map to the custom request. In other words, at step 220, a user may define multiple data sources to bring together into the mashup.

At step 220, selection of a custom request may include defining a custom request in step 222. In step 222, a computing device may receive a definition of a new custom request from a user. For a new custom request, the computing device may prompt a user for a name of the custom request. A computing device may also allow a user to select one or more base requests to map to the custom request. Conventional user interface features, such as selectable lists, dropdown menus, and the like, may be provided by the computer device to allow a user to select one or more base requests to map to a custom request. A computing device may further allow a user to enter a URL for the custom request, a description of the custom request, a request type, or any other useful information.

Further, in step 222, a user may also create one or more custom parameters for the custom request. The custom parameters may be sent to the URL and they will be mapped to base request parameters. For each custom parameter, a user may define a name, a value, a sample value, a designation whether the parameter is required, and the like. A computing device may then allow a user to map each custom parameter to a parameter of one or more base request. Parameter values may be static (i.e., a user may not change the value when making a request to the custom resource) or user definable. Thus, one or more custom parameters' values may be appended to the URL of the custom request to specify what mashup data or content to retrieve from one or more base requests. For each custom request, a computing device may then allow a user to map each custom parameter to a parameter of one or more base requests. In this fashion, parameters to retrieve data from a custom request may be linked to parameters to retrieve data from the one or more base requests. The parameters and mapping may then be saved in a database and associated with the custom request.

Alternatively, selection of a custom request may include editing an existing custom request in step 224. In step 224, a computing device may provide a UI control to allow a user to edit a custom request stored in a database. Once selecting a custom request to edit, a user may modify any of the attributes of the custom request that a user was able to add in step 222. In other words, a user may modify attributes of the custom request such as the custom request's name, description, resource URL, and the one or more base requests mapped to the custom request. A computing device may also allow a user to edit parameters for the custom request and the mapping of the parameters for the base requests to the custom parameters for a custom request. A user may also delete existing custom requests.

Further, a computing device may generate a preview of the custom request with sample values as a URL. A user may then copy and paste the URL into a browser to view the XML response to the custom request to ensure the request contains the desired data requested from each of the base requests.

At the end of step 220, a custom request is defined, thus allowing custom mashup data to be retrieved from a custom resource. Next, at step 230, a computing device may provide a user an interface to define how they would like the mashup data to appear. In other words, the output of one or more base requests may be mapped to a template input. To accomplish this, a computing device may parse the XML data received from the custom request to create a template base model for rendering the data. The parsed response may be in the form of a tree structure providing definitions of what the XML structure looks like. The template may include only the structure (i.e., the template may omit returned values). In step 232, a computing device may provide a Graphical User Interface ("GUI") to allow user to clone the template base model and redefine the XML structure. Redefining the XML structure may include rearranging the structure, deleting portions of the returned data, changing the type of return data (e.g., changing a single value to a list), requiring various elements, or any other modifications may be made. A computing device may provide a GUI to allow a user to drag and drop portions of the tree structure to rearrange the structure. The template created by parsing the XML into a template may be in a conventional extensible format, for example the template may be a FREEMARKER™ style template. Once a user has completed defining the appearance of the response to the custom request, the template may be saved to a database.

In step 234, the template may be edited in a text form. A computing system may progress to step 234 to allow a user to edit the XML parsed to a model of the template and edited by a user in step 232. Alternatively, a computing device may parse the XML data received from the custom request into a template and allow a user to edit the template in text form. The text form of the template may allow an advanced user to make more customized modifications to the response structure. For example, a FREEMARKER™ style template may be edited directly to sort responses in a way that may not be supported from a base request API.

Once a template is created and modified at step 230, at step 240 the template and custom request may be combined to publish a custom resource. The custom resource may, for example, be an API or RSS. In step 242, a new retrieval method, such as a URL for an API, may be defined and associated with a custom request and a template. Additionally, other publication details may be configured, such as how long the custom resource should be cached for, a name for the published resource, a description of the published resource, and the like. A computing device may then publish the resource.

Further, at step 244, a computing device may allow a user to manage the retrieval method of a custom resource. For example, a computing system may allow a user to access a published resource and modify custom resource attributes, such as the URL for the custom resource, a description of the resource, how long the custom resource should be cached, and the like.

The method shown in FIG. 2 thus allows for a custom resource that can have any possible representation. For example, a custom resource may provide a mashup of base resources, and the custom resource may provide an XML page, an HTML page, a JSON, a plain text file, or may take on any other representation. Thus, a custom resource may be implemented for a variety of uses, such as rapid prototyping by providing a user with the ability to quickly draft dynamic web pages, based on a combination of different sources, and have the web pages instantly available to the public.

Figure 3:
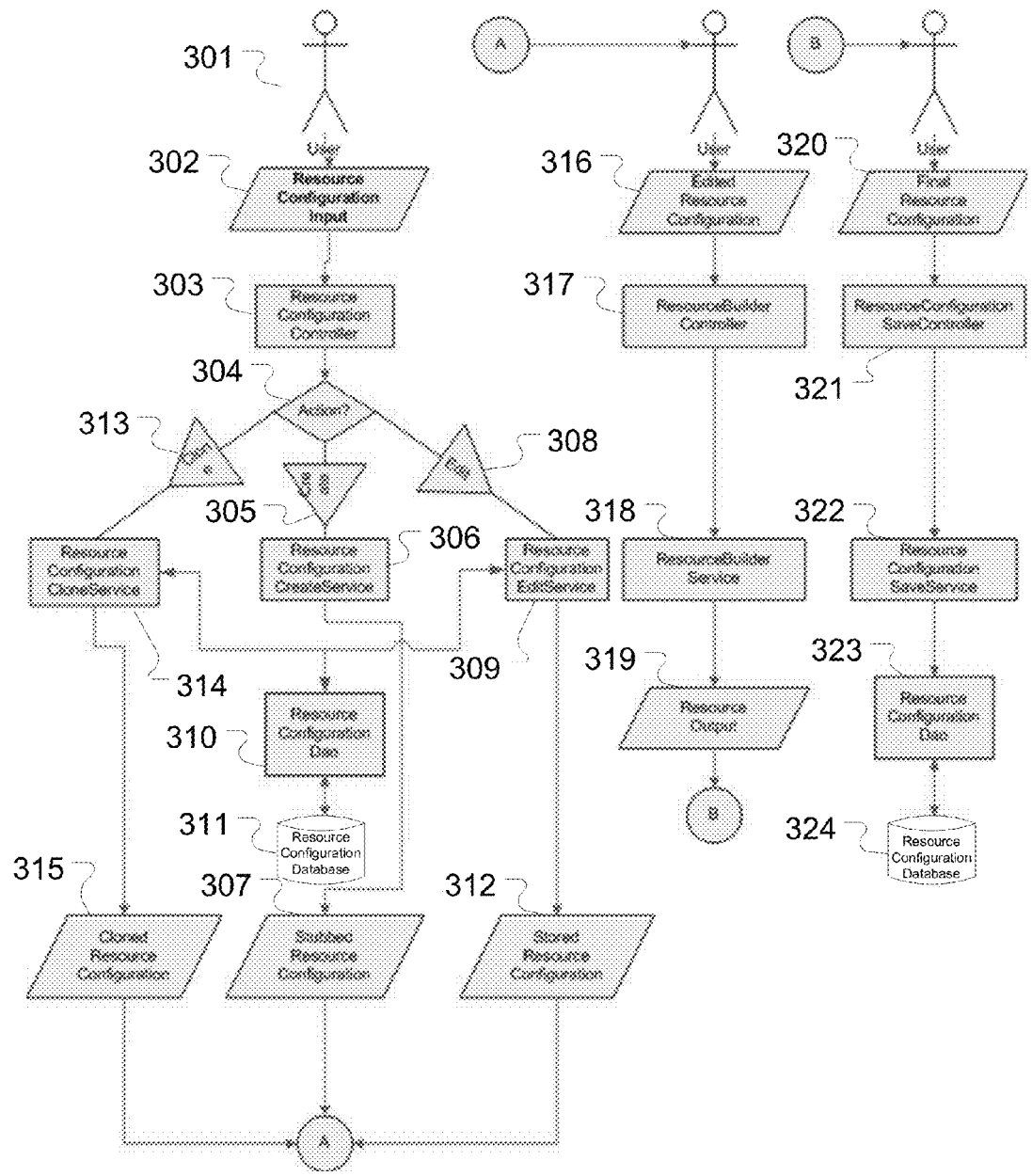
FIG. 3 is a flow diagram showing the data flow for creation of a custom resource according to an embodiment.

FIGS. 3 through 6 are data flow diagrams for a computing system to create custom resources for mashups. FIG. 3 is a flow diagram showing the data flow for creation of a custom resource. A user 301 may provide resource configuration input 302 to a computing device. A resource configuration controller 303 may receive the user input and determine an appropriate action 304 to take depending on the user input. If the configuration input 302 indicates the user wishes to create a new custom resource, action 304 directs the data flow to create 305 and a resource configuration create service 306. A computing device may then transmit to a user the stubbed resource configuration 307 data.

Alternatively, if the configuration input 302 indicates the user wishes to edit a custom resource, action 304 directs the data flow to edit 308 and a resource configuration edit service 309. Resource configuration edit service 309 may request stored resource configuration data from resource configuration data access object ("DAO") 310. Resource configuration DAO 310 may then retrieve the requested data from a custom resource configuration data database 311 and return the custom resource configuration data to resource configuration service 309. A computing device may then transmit to a user the stored resource configuration 312 data.

Further, if the configuration input 302 indicates the user wishes to clone a custom resource, action 304 directs the data flow to clone 313 and a resource configuration clone service 314. Resource configuration clone service 314 may request stored resource configuration data from resource configuration data access object ("DAO") 310. Resource configuration DAO 310 may then retrieve the requested data from a custom resource configuration data database 311 and return the custom resource configuration data to resource configuration service 309. Resource configuration clone service 314 may then clone the retrieved custom resource configuration data. A computing device may then transmit to a user the cloned resource configuration 315 data.

Independent of whether a computing device presents the user with stubbed resource configuration 307 data, stored resource configuration 312 data, or cloned resource configuration 315 data, a user may edit the resource configuration data. A resource builder controller 317 may receive the edited resource configuration 316 data from the user. A resource builder service 318 may then build a resource output 319. A user may then edit the resource output. A resource configuration save controller 321 may receive the final resource configuration 320 from a user, for example in response to receiving a save request from a user. A resource configuration save service 322 may then transmit the final resource configuration 320 to a resource configuration DAO 323 to be saved in a custom resource configuration data database 324.

Figure 4:
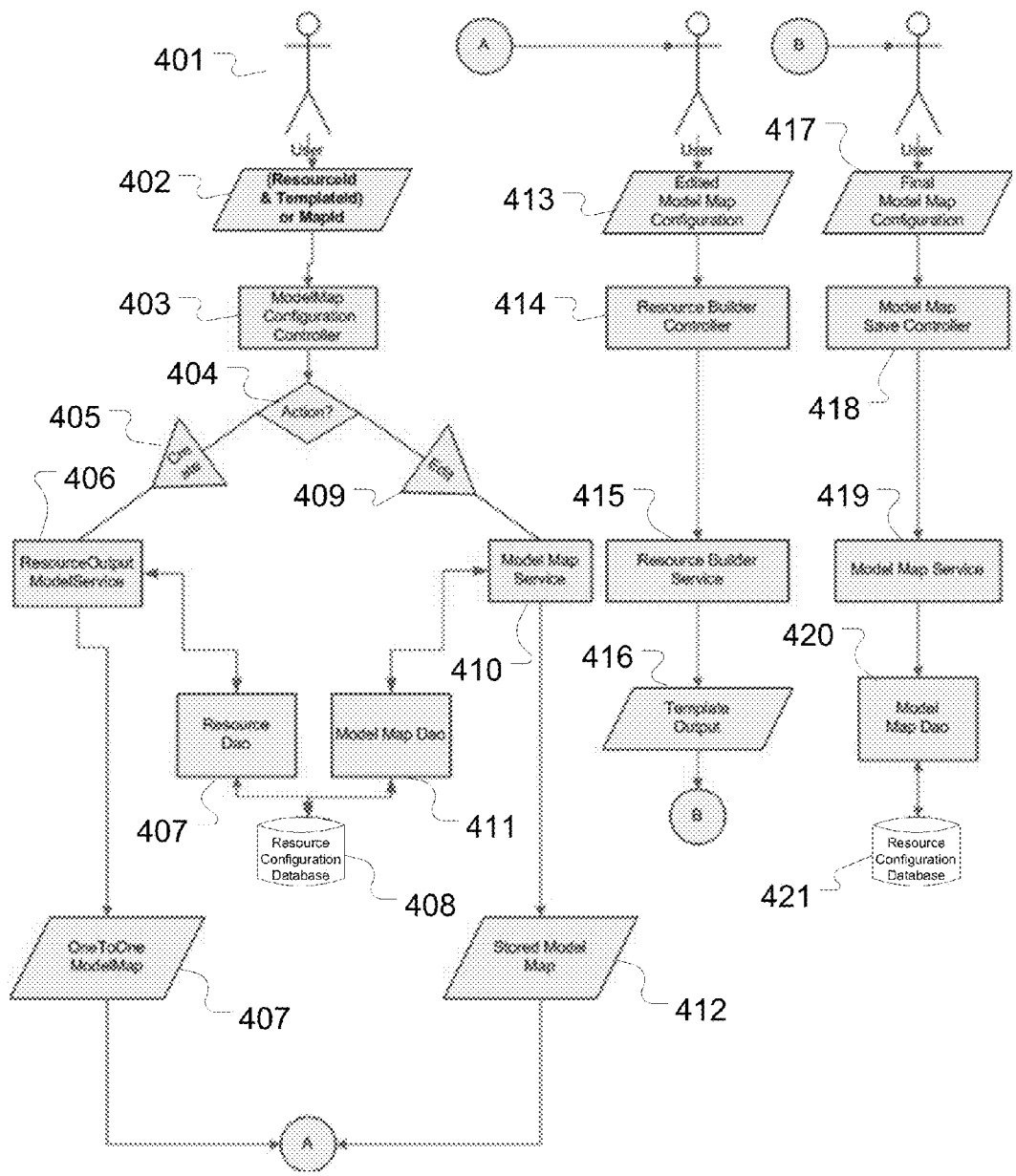
FIG. 4 is a flow diagram showing the data flow for mapping a custom resource output to a template input according to an embodiment.

FIG. 4 is a flow diagram showing the data flow for mapping a custom resource output to a template input. In the data flow, a model map configuration controller 403 may receive a resource ID and a template ID (or a map ID, wherein a model map is a mapping of the output of a custom resource to a template input) 402 from a user 401. The model map configuration controller 403 may determine an action 404 depending on the resource Id and template ID (or map ID) 402. If the resource ID and the template ID (or the map ID) 402 indicates that a user wishes to create a new template, action 404 directs the data flow to create 405 and a resource output model service 406. The resource output model service 406 may request custom resource data from resource DAO 407. Resource DAO 407 may request and, in response, receive custom resource data from a custom resource configuration data database 408. Resource output model service 406 may then generate a one-to-one model map 407 of the custom resource configuration data to a template input. A computing device may then transmit to a user the one-to-one model map 407.

Alternatively, if the resource ID and the template ID (or the map ID) 402 indicates that a user wishes to edit an existing template, action 404 directs the data flow to edit 409 and a model map service 410. The model map service 410 may request model map data from model map DAO 411. Model map data DAO 411 may request and, in response, receive model map data from a custom resource configuration database 408. Model map service 410 may then provide stored model map 412. A computing device may then transmit to a user the stored model map 412.

Resource builder controller 414 may then receive edited model map configuration data 413 from a user. A resource builder service 415 may then generate a template output 416 based on the edited model map configuration 413 data. A user may then edit the template output. A model map save controller 418 may receive the final model map configuration 417 from a user, for example in response to receiving a save request from a user. A model map service 419 may then transmit the final model map configuration 417 to a model map DAO 420 to be saved in a custom resource configuration data database 421.

Figure 5:
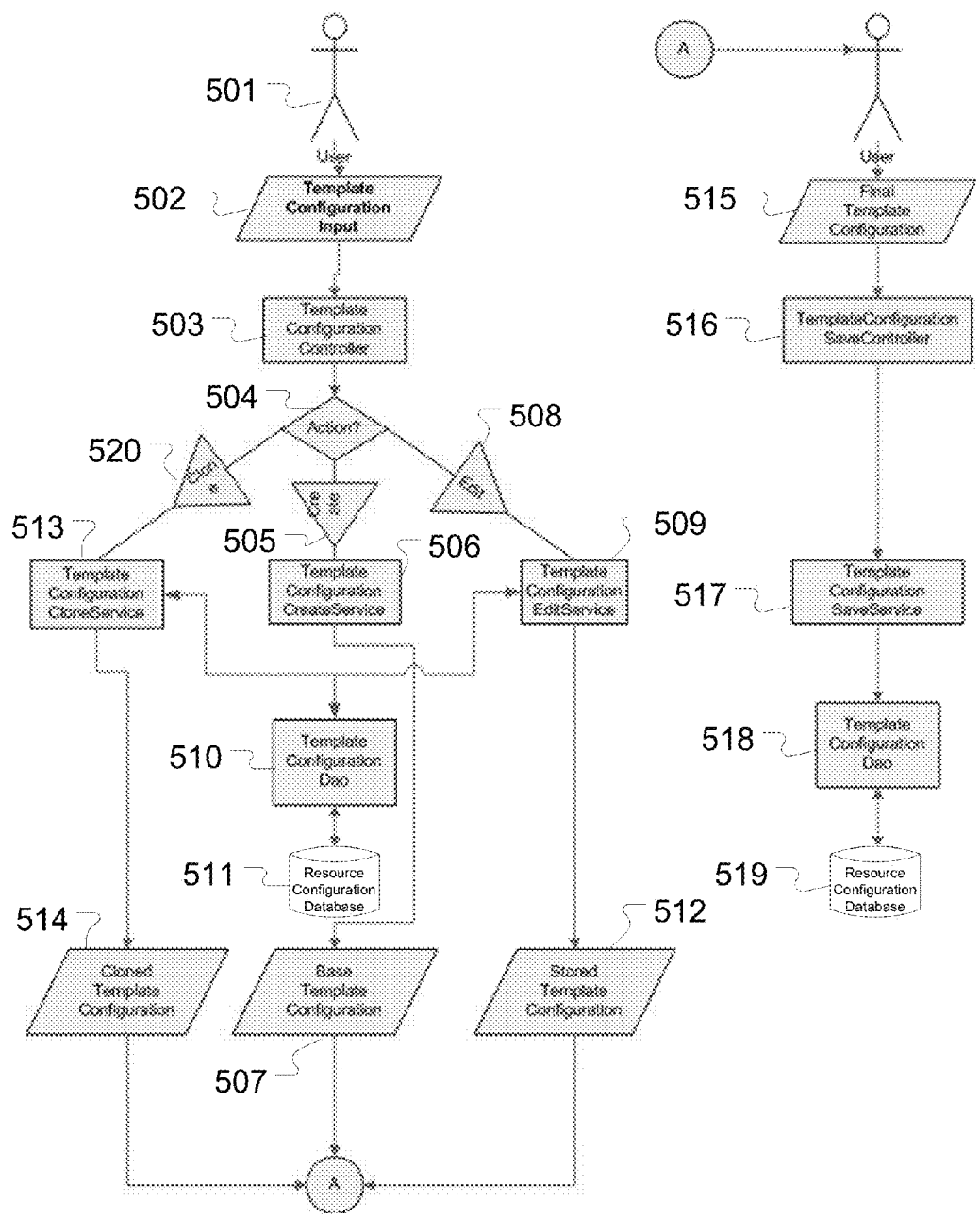
FIG. 5 is a flow diagram showing the data flow for a custom resource template configuration according to an embodiment.

FIG. 5 is a flow diagram showing the data flow for a custom resource template configuration. In the data flow, a template configuration controller 503 may receive a template configuration input 502 from a user 501. The template configuration controller 503 may determine an action 504 depending on the template configuration input 502. If the template configuration input 502 indicates that a user wishes to create a new template, action 504 directs the data flow to create 505 and a template configuration create service 506. The template configuration service 506 may then generate a base template configuration 507. A computing device may then transmit the base template configuration 507 to a user.

Alternatively, if the template configuration input 502 indicates that a user wishes to edit a template, action 504 directs the data flow to edit 508 and a template configuration edit service 509. Template configuration edit service 509 may request template configuration data from template configuration DAO 510. Template configuration DAO 510 may request and, in response, receive template configuration data from a custom resource configuration data database 511. Template configuration edit service 509 may then output stored template configuration 512. A computing device may then transmit to a user the stored template configuration 512.

Further, if the template configuration input 502 indicates that a user wishes to clone a template, action 504 directs the data flow to clone 520 and a template configuration clone service 513. Template configuration clone service 513 may request template configuration data from template configuration DAO 510. Template configuration DAO 510 may request and, in response, receive template configuration data from a custom resource configuration data database 511. Template configuration clone service 513 may then generate a clone of template configuration data from the custom resource configuration data database 511 and output cloned template configuration 514. A computing device may then transmit to a user the cloned template configuration 514.

A user may then edit the template configuration. A template configuration save controller 516 may receive the final template configuration 515 from a user, for example in response to receiving a save request from a user. A template configuration save service 517 may then transmit the final template configuration 518 to a template configuration DAO 518 to be saved in a custom resource configuration data database 519.

Figure 6:
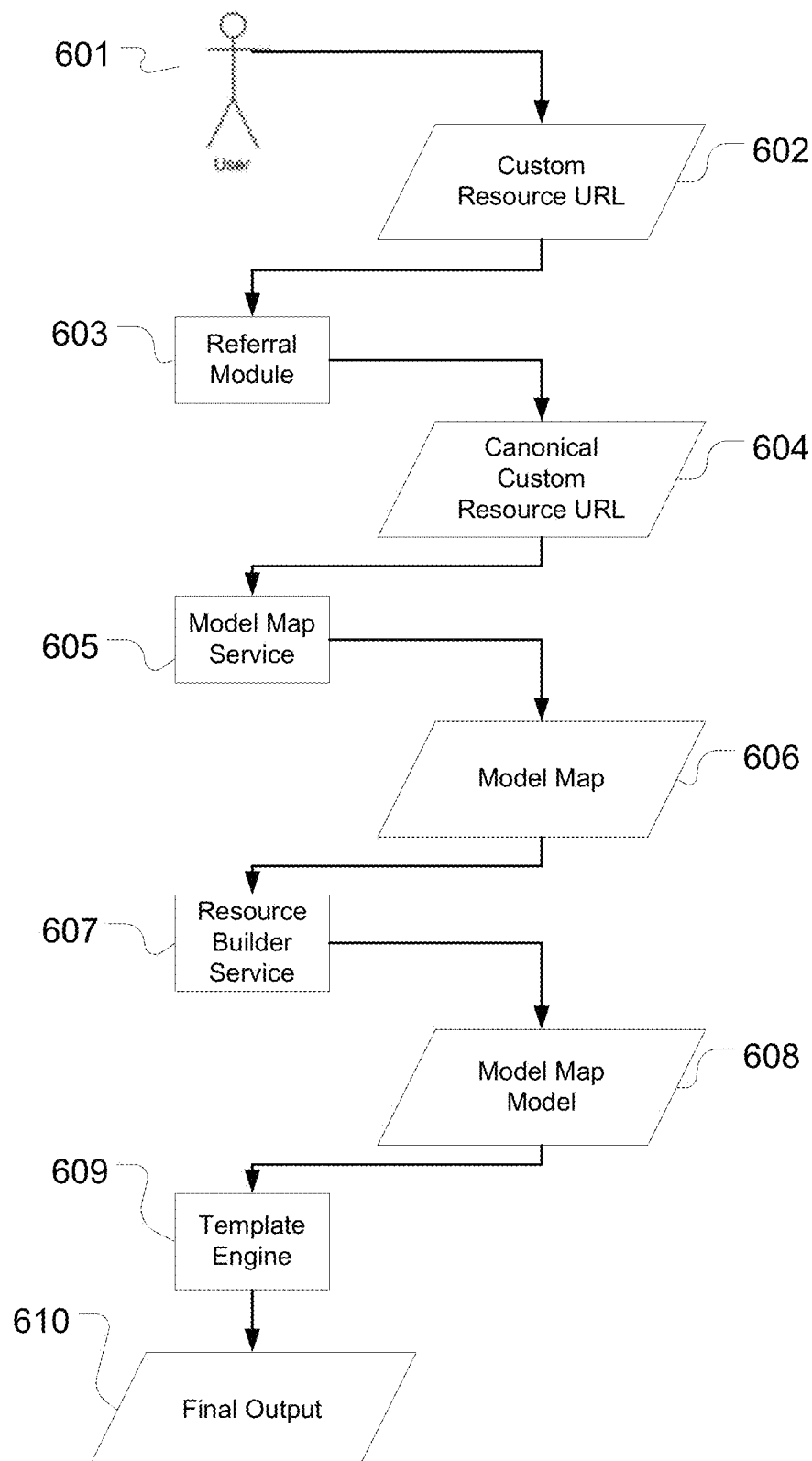
FIG. 6 is a flow diagram showing the data flow for a custom resource builder according to an embodiment.

FIG. 6 is a flow diagram showing the data flow for a custom resource builder. In the data flow, a referral module 603 may receive a custom resource URL 602 from a user 601. Referral module 603 may normalize custom resource URL 602 received from user 601 and generate a canonical custom resource URL 604. A model map service 605 may receive the canonical custom resource URL 604 and output a model map 606. Resource builder service 607 may receive the model map 606, build a custom resource, and publish a model map model 608. A template engine 609 may then associate template inputs to the model outputs of model map model 608 and publish the resource as final output 610.

While FIGS. 3 through 6 provide plural custom resource configuration databases (databases 311, 324, 408, 412, 511, and 519), each of the databases referred to may be the same database. Likewise, while multiple users are shown, embodiments may receive input from either a single user or plural users.

Embodiments may store the published templates in any file or database and then later execute the final output upon receipt of a request by the custom resource. This allows embodiments to reduce resource use in comparison to Java Server Pages ("JSPs") which must be compiled and must physical run on the server. This also allows embodiments to be deployed by simply updating a database of templates and a front end of the system may then access the database for the templates and the mapping of the base requests to a template.

Figure 7:
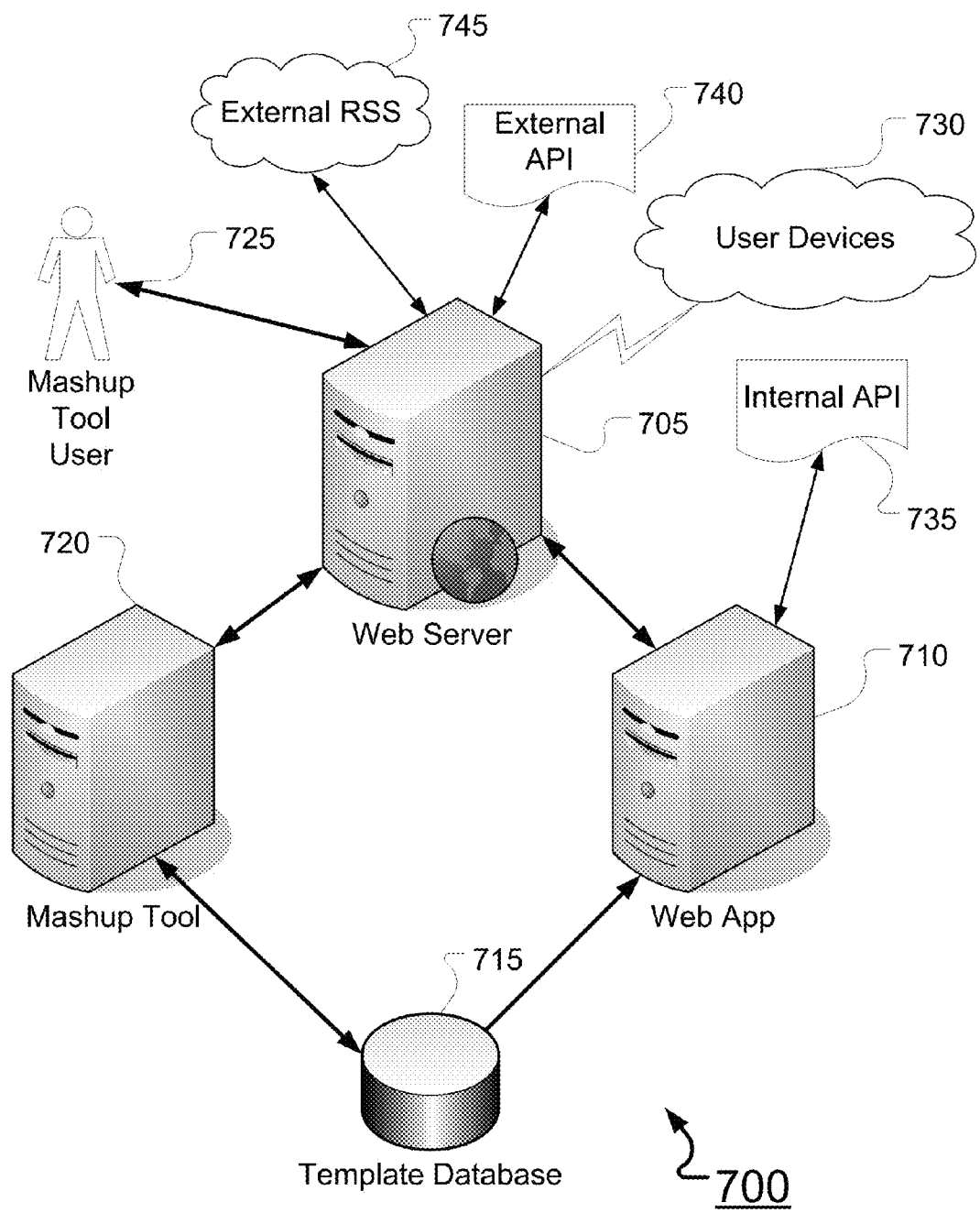
FIG. 7 is a schematic diagram of an exemplary system architecture for providing a mashup tool to a mashup tool user and providing a custom resource to one or more user devices according to an embodiment.

FIG. 7 is a schematic diagram of a system architecture 700 for both providing a mashup tool 720 to a mashup tool user 725 and providing a custom resource to one or more user devices 730. A user 725 may access web server 705 in conventional fashion (e.g., through an internet browser's interface, through an application, etc.) to create a custom resource. Web server 705 may then direct user to a mashup tool 720 to create, clone, or edit a template for a custom resource according to the steps discussed with reference to FIGS. 2-6. Mashup tool 720 may read or right to a template database 715. Template's published by mashup tool 720 may be stored in template database 715 for access by web app 710 when a custom request is received.

A user device 730 may send a request to web server 705 as a custom resource. Web server 705 may direct the request to a web application 710. Web application 710 may retrieve a template corresponding to the request from a template database 715 and execute the template to implement a custom mashup defined by the template. Web app 710 may then transmit base requests defined in the template, each having one or more parameter values corresponding to the request from a user device 730. For example, web app 710 may transmit base requests to an internal API 735, an external API 740, and an external RSS feed 745. Web app 710 may then receive the responses to the requests, combine and format the responses according to the template, and return a custom mashup to user device 730 via web server 705.

System architecture 700 illustrates the ease of deploying additional custom resources according to disclosed embodiments. A mashup tool user 725 may define and publish various templates via mashup tool 720 and the published templates may be stored by mashup tool 720 in template database 715. At the same time, web app 710 may provide a custom resource for custom requests received by web server 705 by accessing published templates stored in template database 715. Additionally, the integrity of templates may be increased by providing web application 710 with read-only access to template database 715.

Of course, web server 705, mashup tool 720, web app 710, and template database 715 may be implemented on one or more computing device. Additionally, other intermediate computing devices may be included between web server 705, mashup tool 720, and web app 710, for example cache servers, load bearing servers, and the like.

Figure 8:
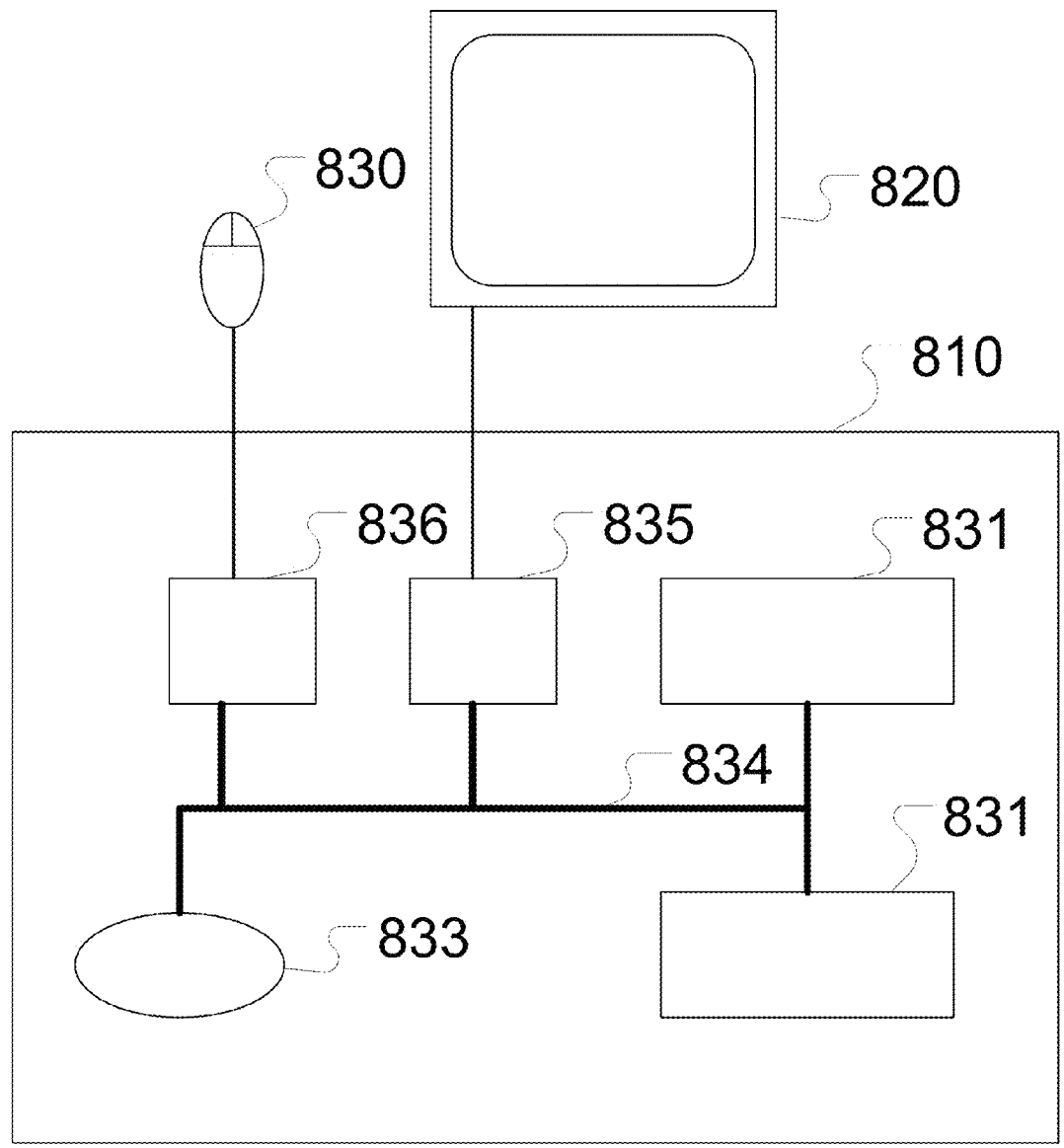
FIG. 8 shows a computing device useful for performing processes disclosed herein.

These embodiments may be implemented with modules of software executed on hardware or hardware modules with or without embedded firmware, for example, functional software executed on computing devices such as computing device 810 of FIG. 8. Embodiments may, for example, execute modules corresponding to the method of block diagram 200. Of course, steps may be performed by more than one module, a single module may perform more than one step, or any other logical division of steps of block diagram 200 may be used to implement the method as software executed on one or more computing devices.

Computing device 810 has one or more processing device 811 designed to process instructions, for example computer readable instructions (i.e., code) stored on a storage device 813. By processing instructions, processing device 811 may perform the steps set forth in block diagram 200. Storage device 813 may be any type of storage device (e.g., an optical storage device, a magnetic storage device, a solid state storage device, etc.), for example a non-transitory storage device. Alternatively, instructions may be stored in non-transitory remote storage devices, for example storage devices accessed over a network or the Internet. Computing device 810 additionally has memory 812, an input controller 816, and an output controller 815. A bus 814 operatively couples components of computing device 810, including processor 811, memory 812, storage device 813, input controller 816, output controller 815, and any other devices (e.g., network controllers, sound controllers, etc.). Output controller 815 may be operatively coupled (e.g., via a wired or wireless connection) to a display device 820 (e.g., a monitor, television, mobile device screen, touch-display, etc.) in such a fashion that output controller 815 can transform the display on display device 820 (e.g., in response to modules executed). Input controller 816 may be operatively coupled (e.g., via a wired or wireless connection) to input device 830 (e.g., mouse, keyboard, touch-pad, scroll-ball, touch-display, etc.) in such a fashion that input can be received from a user.

Of course, FIG. 8 illustrates computing device 810, display device 820, and input device 830 as separate devices for ease of identification only. Computing device 810, display device 820, and input device 830 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 810 may be one or more servers, for example a farm of networked servers, a clustered server environment, or a cloud network of computing devices, configured to serve custom resources, such as APIs.

Embodiments may be useful for mashing up any type of content from one or more data sources. For example, content may be web pages, user generated content, images, streaming or downloadable content, such as streaming or downloadable video and/or music, or other data. Further, embodiments may mashup various types of content to provide a custom resource, for example streaming video and other content may be mashed up together.

Exemplary embodiments have been described. However, various modifications can be made without departing from the scope of the embodiment as defined by the appended claims and legal equivalents.

What is claimed is:

1. A method executed by one or more computing devices for providing customized content delivery, the method comprising:

receiving, by at least one of the one or more computing devices, a selection of a plurality of base requests, wherein the plurality of base requests specify a plurality of data sources and wherein execution of the plurality of base requests results in retrieval of content from the plurality of data sources;

receiving, by at least one of the one or more computing devices, a mapping of the plurality of base requests to one or more custom requests, wherein execution of the one or more custom requests results in execution of at least one of the plurality of base requests;

receiving, by at least one of the one or more computing devices, a mapping of the one or more custom requests to an output template, wherein output of the one or more custom requests is formatted according to the output template and wherein receiving the mapping of the one or more custom requests to the output template comprises:

parsing the one or more custom requests into a model of the output template;
transmitting the model;
receiving one or more modifications to the model; and
building the modified model into the output template; and executing, by at least one of the one or more computing devices, the one or more custom requests, wherein execution of the one or more custom requests results in content retrieved from at least one of the plurality of data sources being formatted according to the output template.

2. The method of claim 1, wherein receiving the selection of the plurality of base requests comprises receiving a selection of an existing base request.

3. The method of claim 1, wherein receiving the selection of the plurality of base requests comprises receiving a new base request.

4. The method of claim 3, wherein the new base request includes a uniform resource locator and a resource description for a data source.

5. The method of claim 1, wherein receiving the selection of the plurality of base requests includes receiving one or more parameters for each base request and wherein at least one custom request in the one or more custom requests has at least one associated parameter.

6. The method of claim 5, further comprising receiving a mapping of the at least one parameter associated with the at least one custom request to at least one parameter associated with one or more base requests in the plurality of base requests.

7. The method of claim 6, further comprising receiving a mapping of an output template variable to the at least one parameter associated with the at least one custom request.

8. The method of claim 1, wherein the model comprises a tree definition.

9. The method of claim 1, further comprising:
transmitting, by at least one of the one or more computing devices, the output template;
receiving, by at least one of the one or more computing devices, a modified output template; and
rebuilding, by at least one of the one or more computing devices, the output template according to the modified output template.

10. The method of claim 9, wherein the output template is a markup language template.

11. The method of claim 1, wherein the one or more custom requests are executed based at least in part on a uniform resource locator.

12. The method of claim 1, further comprising saving the output template to a database for retrieval by a computing device.

13. An apparatus for providing customized content delivery, the apparatus comprising:
one or more processors; and
one or more memories operatively coupled to at least one of the one or more processors and having instructions stored thereon that, when executed by at least one of the one or more processors, cause at least one of the one or more processors to:
receive a selection of a plurality of base requests, wherein the plurality of base requests specify a plurality of data sources and wherein execution of the plurality of base requests results in retrieval of content from the plurality of data sources;
receive a mapping of the plurality of base requests to one or more custom requests, wherein execution of the one or more custom requests results in execution of at least one of the plurality of base requests;
receive a mapping of the one or more custom requests to an output template, wherein output of the one or more custom requests is formatted according to the output template and wherein receiving the mapping of the one or more custom requests to the output template comprises:
    parsing the one or more custom requests into a model of the output template;
    transmitting the model;
    receiving one or more modifications to the model; and
    building the modified model into the output template; and
execute the one or more custom requests, wherein execution of the one or more custom requests results in content retrieved from at least one of the plurality of data sources being formatted according to the output template.

14. The apparatus of claim 13, wherein the instructions that, when executed by at least one of the one or more processors, cause at least one of the one or more processors to receive a selection of a plurality of base requests further cause at least one of the one or more processors to receive a new base request.

15. The apparatus of claim 14, wherein the new base request includes a uniform resource locator and a resource description for a data source.

16. At least one non-transitory computer-readable medium storing computer-readable instructions that, when executed by one or more computing devices, cause at least one of the one or more computing devices to:
    receive a selection of a plurality of base requests, wherein the plurality of base requests specify a plurality of data sources and wherein execution of the plurality of base requests results in retrieval of content from the plurality of data sources;
    receive a mapping of the plurality of base requests to one or more custom requests, wherein execution of the one or more custom requests results in execution of at least one of the plurality of base requests;
    receive a mapping of the one or more custom requests to an output template, wherein output of the one or more custom requests is formatted according to the output template and wherein receiving the mapping of the one or more custom requests to the output template comprises:
        parsing the one or more custom requests into a model of the output template;
        transmitting the model;
        receiving one or more modifications to the model; and
        building the modified model into the output template; and
    execute the one or more custom requests, wherein execution of the one or more custom requests results in content retrieved from at least one of the plurality of data sources being formatted according to the output template.

17. The at least one non-transitory computer-readable medium of claim 16, wherein the instructions that, when executed by at least one of the one or more computing devices, cause at least one of the one or more computing devices to receive a selection of a plurality of base requests further cause at least one of the one or more computing devices to receive a new base request.

18. The at least one non-transitory computer-readable medium of claim 17, wherein the new base request includes a uniform resource locator and a resource description for a data source.

\* \* \* \* \*